United States Patent [19]

Takada

[11] 4,269,434

[45] May 26, 1981

[54] PASSIVE VEHICLE OCCUPANT RESTRAINT LAP AND SHOULDER BELT SYSTEM

[76] Inventor: Juichiro Takada, 3-12-1, Shinmachi, Setagayaku, Tokyo, Japan

[21] Appl. No.: 10,212

[22] Filed: Feb. 8, 1979

[30] Foreign Application Priority Data

May 15, 1978 [JP] Japan .............................. 53-63961[U]

[51] Int. Cl.³ .............................................. B60R 21/10
[52] U.S. Cl. .................................................... 280/803
[58] Field of Search ............... 280/803, 804, 808, 802; 296/137 G

[56] References Cited

U.S. PATENT DOCUMENTS

| | | | |
|---|---|---|---|
| 3,266,328 | 8/1966 | Rott | 296/137 G X |
| 3,754,776 | 8/1973 | Cataldo | 280/803 |
| 3,933,369 | 1/1976 | Kaneko et al. | 280/803 |
| 3,964,784 | 6/1976 | Prechter | 296/137 G X |
| 3,968,978 | 7/1976 | Hayashi | 280/803 |

Primary Examiner—John J. Love
Assistant Examiner—Norman L. Stack
Attorney, Agent, or Firm—Brumbaugh, Graves, Donohue & Raymond

[57] ABSTRACT

The lap and shoulder seat belts of a passive vehicle occupant restraint belt system are moved from their restraining to their releasing positions in response to opening of the vehicle door. The apparatus includes a lap belt transfer device engaging the lap belt and a shoulder belt transfer device engaging the shoulder belt, each for moving the respective lap and shoulder belt from their restraining to their releasing positions. A rotary drive has a single output shaft and first and second output drive elements on the shaft coupled to the lap and shoulder belt transfer devices for actuating the first and second belt transfer devices simultaneously. A linkage is provided for operating the rotary drive responsive to opening of the vehicle door.

4 Claims, 3 Drawing Figures

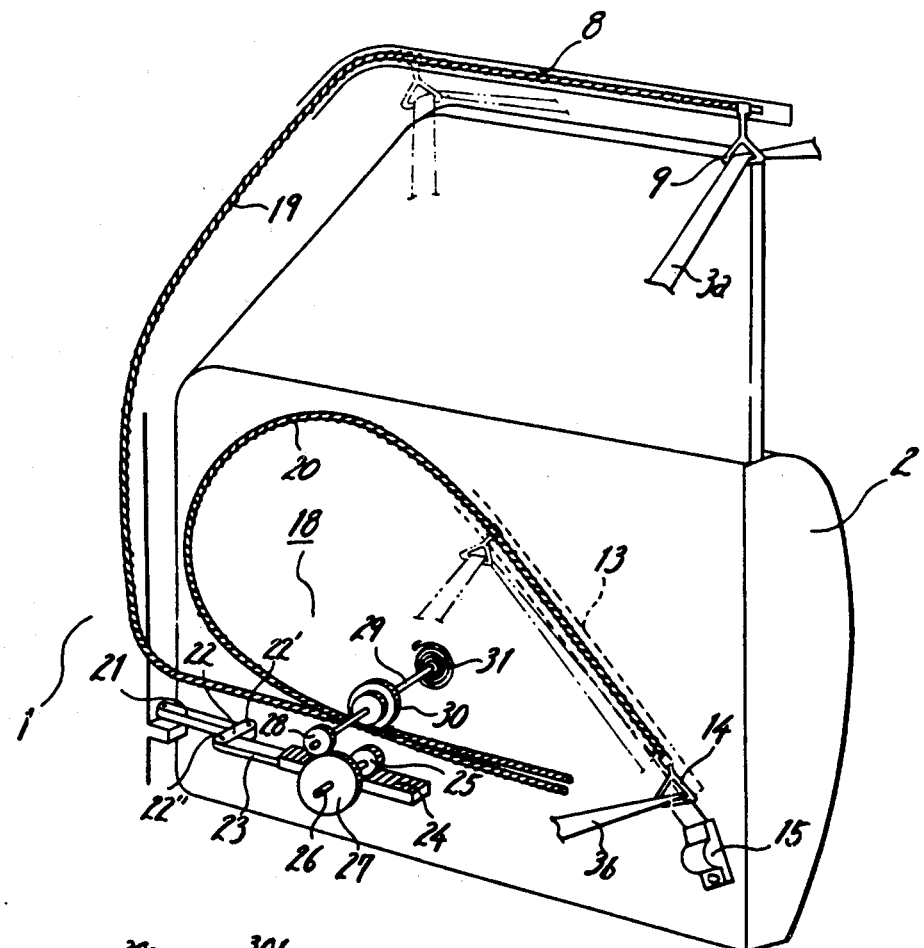
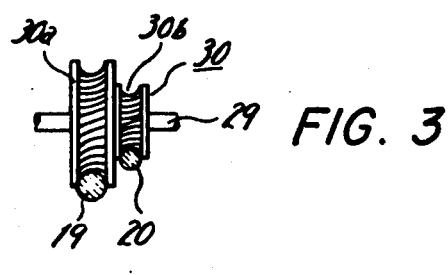
FIG. 2
FIG. 3

PASSIVE VEHICLE OCCUPANT RESTRAINT LAP AND SHOULDER BELT SYSTEM

BACKGROUND OF THE INVENTION

This invention relates to a passive vehicle occupant restraint belt system including both a lap belt and a shoulder belt, in which the belts are automatically, easily and effectively transferred between an occupant-restraining and an occupant-releasing configuration in response to the opening and closing movements of a vehicle door, and preferably, are transferred substantially fully to the releasing configuration when the door is opened toward the opened position.

In recent years there have been many proposals for passive occupant-restraining systems for vehicles. The most common types of restraint systems are those based on restraint belts, and most of the proposed belt systems include a belt transfer mechanism which is driven by an electric motor, a mechanical lever, or a gear transmission. Many of the proposed systems, particularly those which use a mechanical drive to transfer the belt, require that the vehicle door be fully open to attain full release of the belt.

The problem of moving the belts from their restraining to their releasing positions, in cases where both a shoulder seat belt and lap seat belt are used, is complicated by the fact that the directions and distances of movement of the respective belts will not always be the same. It has therefore been necessary in the past to provide at least two driving mechanisms for moving each belt from the passenger-restraining to the passenger-releasing position. Since the space inside the door is narrow and limited, installation of these driving mechanisms tends to become bulky and complicated.

In addition, especially where a mechanical force, imparted through the opening movement of the door, is used to operate the belt moving system, there may be a further problem. Since the distance of movement of the shoulder belt is often longer than that of the lap belt, upon initial opening of the door, only the shoulder belt is moved toward its passenger-releasing position. At some point, however, movement of the lap belt must also be initiated, which results in a sharp step-up force to continue opening the door, and a jerking of the belt-moving mechanism and door.

SUMMARY OF THE INVENTION

There is provided, in accordance with the present invention, a passive vehicle occupant restraint belt system including a lap belt and a shoulder belt which can be moved from an occupant-restraining to an occupant-releasing position by a partial opening of the door characterized in that the shoulder and lap belts are simultaneously actuated by separate driving members, which are in turn driven by a single transmission and door amplifier assembly having a single output shaft. In accordance with the present invention, the non-uniformities of load of moving the lap belt and shoulder belt to the releasing position, as would otherwise occur, are eliminated. In addition, the device is simple in construction and compact for easy incorporation into the limited door space.

In a preferred embodiment, the lap belt and the shoulder belt each pass through a guide ring slidably mounted to the door and above the door in the roof, respectively. Each guide ring is attached to a racked wire which moves the ring to transfer the respective belt between an occupant-restraining position and an occupant-releasing position. The other ends of the two racked wires separately engage two output gears mounted on a single output shaft of a motion transmission-amplifier mechanism, such as a gear type motion amplifier which is actuated by a folding linkage connected between the door and the automobile frame. A suitable motion amplifier and the associated folding linkage are described and shown in U.S. application Ser. No. 950,020, filed Oct. 10, 1978, and owned by the assignee of of the present invention. Upon partial opening of the door, the folding linkage and motion amplifier transmit the opening motion and amplify it to move the two guide rings fully to their releasing position. The motion amplifier may, however, be driven by other means, such as a motor, actuated in response to a signal indicating partial door opening. In this manner, a single motion amplifier mechanism will actuate the two belt transfer mechanisms simultaneously to transfer the belts from their restraining to their releasing positions, even though the guide rings are moved along different distances.

BRIEF DESCRIPTION OF THE DRAWINGS

FIG. 2 is another pictorial, schematic drawing of the system in FIG. 1 in the occupant-restraining position and showing the motion amplifier and belt transfer device in greater detail; and FIG. 3 is a fragmentary side view of the output element of the motion amplifier shown in FIG. 2.

DETAILED DESCRIPTION OF AN EXEMPLARY EMBODIMENT

Figure 1:
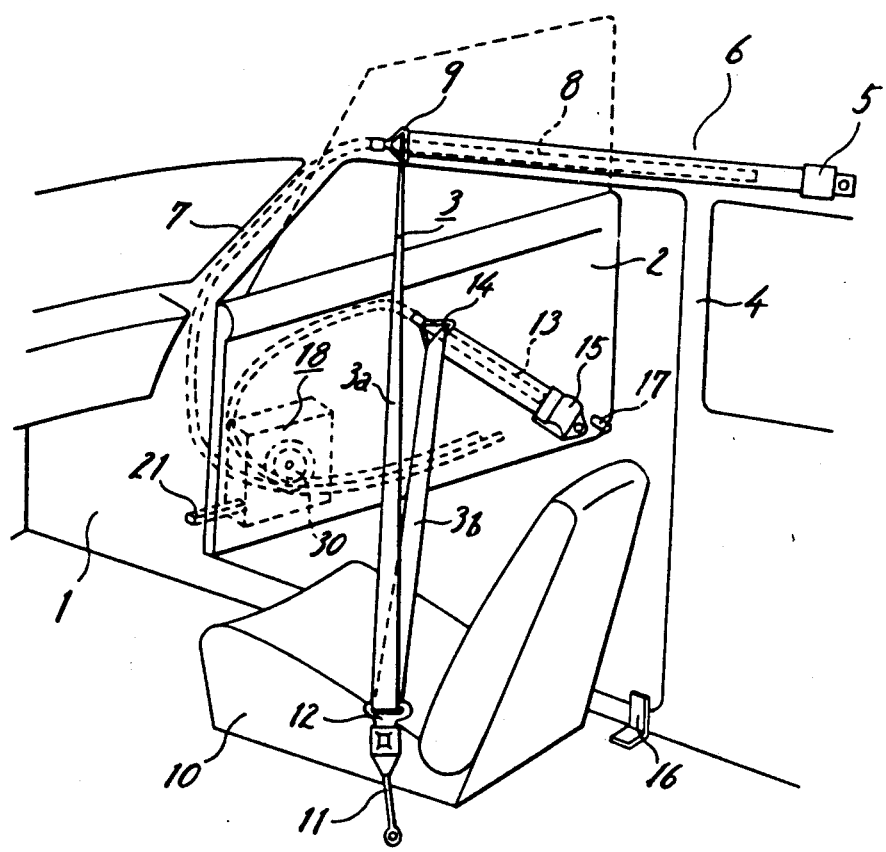
FIG. 1 is a pictorial view in schematic form of an embodiment of a complete belt restraint system shown in the occupant-releasing configuration.

The restraint belt system shown in FIGS. 1–3 is associated with a door 2 that is hinged along its front end to the vehicle body 1 and employs a single continuous restraint belt 3. One end of the belt 3 is attached to an emergency locking retractor 5 which applies tension to the belt to urge the belt into the passenger-restraining position. The emergency locking retractor 5 is fitted at a position near the upper portion of a central pillar 4 of the car body 1. The belt 3 extends through a guide ring 9 which is movable along a guide rail 8 extending along the roof 6 just above the door from near the central pillar 4 to near the front pillar 7 of the vehicle and then passes across one of the vehicle seats 10 to and freely through a ring 12 detachably fitted to a buckle 11 fixed on the seat or floor on the inboard side of the seat. The belt extends from the ring 12 back across the seat 10 and passes to and freely through a second guide ring 14 which is slidable along a guide rail 13 extending generally diagonally along the door. This end of the belt 3 is wound into an emergency locking retractor 15 mounted near the lower rear corner of the door 2. The ring 12 divides the belt 3 into a shoulder belt portion 3a and a lap belt portion 3b. The guide rail 13 extends from the lower outer end of the inside of the vehicle door diagonally upwardly and forwardly to a releasing position (FIG. 1).

Under normal operation of the vehicle, the two retractors 5 and 15 normally act as take-up reels to apply tension to the belts, but enable the belts to be pulled out freely and will not prevent movement of the person sitting in the seat. When a collision occurs in which there is a rapid acceleration or deceleration, however, or when the car overturns, the belt retractors automatically lock the belts in response to a sharp pull-out force on the belts or motion of inertial devices, and thus restrain the occupant during the emergency situation. Suitable locking retractors for this purpose are well known in the art. The retractors 5 and 15 are preferably of a type in which the locking mechanisms are not activated unless a contact member 16 on the car body is in an engaged position with an operating pin 17 on the door. Thus, when the door is opened, the belt may always be freely pulled out of the retractors 5 and 15.

FIG. 2 illustrates an example of two belt transfer devices, one each for the lap belt 3b and the shoulder belt 3a, driven by a single motion amplifier 18 for moving the shoulder belt 3a and lap belt 3b between occupant-restraining and occupant-releasing positions upon partial opening of the vehicle door 2. The motion amplifier is, in turn, actuated by opening the door by a folding linkage.

In the example, the belt transfer devices include flexible racked wires 19 and 20 (i.e., wires having regularly spaced teeth or similar projections suited for positive drive) attached to guide the respective rings 9 and 14. Movement of the wires 19 and 20 will move the guide rings 9 and 14 along the respective guide rails 8 and 13. The racked wires 19 and 20 are driven simultaneously by a pair of output gears 30 mounted on a single output shaft of the motion amplifier 18.

The motion amplifier 18, with the exception of the novel output arrangement, and the folding linkage have a construction similar to that disclosed in the specification and drawings of U.S. patent application Ser. No. 950,020, filed Oct. 10, 1978 by the inventor of the present invention. The linkage consists of a first link 21 having one end pivotally attached to the door frame of the vehicle body 1, and the other end coupled by a first pin 22' to one end of a short connecting link 22. The other end of the connecting link 22 is connected by a second pin 22" to one end of a second link 23, the other end which carries a rack gear 24.

The motion amplifier mechanism 18 comprises an input pinion 25 which meshes with and is driven by the rack gear 24, a large gear 27 mounted on a common shaft 26 with the input opinion 25 to be concentric to and rotatable with the pinion 25, a second pinion 28 which meshes with and is driven by the large gear 27, and an output element 30 on a common shaft with and driven by the second pinion 28. A spiral spring 31 is coupled to a shaft 29 of the pinion 28 and is so arranged as to store energy when the door is moved from a partway opened position to a closed position and deliver energy when the door is moved from the closed position to a partially opened position, thereby to assist in transferring the belt from the restraining to the releasing position.

The output element 30 is secured to the shaft of the second pinion 28, and consists of a large driving gear 30a which engages the racked wire 19 for moving the shoulder belt transfer ring 9, and a small driving gear 30b which engages the racked wire 20 for moving the lap belt transfer ring 14.

In the embodiment shown, the gear 30a is illustrated as a large diameter gear relative to the gear 30b. The construction, however, of the gears 30a and 30b is not particularly limited to those shown in the drawings and will be designed in accordance with the desired distance of movement of each of the guide rings 9 and 14.

Likewise, the invention is not limited to the embodiment of the guide ring transfer mechanism shown, but may be used with modified versions thereof. For example, one end of each of a pair of flexible wires or tapes may be secured to the respective guide rings 9 and 14. The wire or tape passes through a sheath extending between the guide rails 8 and 13 and the motion amplifier 18. Instead of being driven in both directions by the motion amplifier 18 through the output gears 30, each wire or tape may be wound onto a separate take-up reel, one reel for each wire or tape being mounted concentrically on the shaft of the pinion 28, as the door is opened. The belt transfer rings 9 and 14 may be biased in the direction of their restraining positions with a wire or tape attached between each of the guide rings 9 and 14 and the retractors 5 and 15, either by having the retractors act as take-up devices for the wires or tapes or by providing separate take-up devices to pull the guide rings 9 and 14 back to their restraining positions (see FIG. 2).

Although not shown in the drawings, the first link 21, the connecting link 22, and the second link 23 are received in control grooves or slots, as disclosed in the aforementioned United States application Ser. No. 950,020, filed Oct. 10, 1978. The construction is such that the linkage remains folded to drive the gear train and produce movement of the guide rings 9 and 14 to their occupant-releasing positions in response to the opening of the door 2. When the guide rings 9 and 14 reach the releasing positions in the guide rails (FIG. 1) the linkage unfolds and the second rod 23 ceases to move relative to the gear train.

The operation of the passive belt restraining device of the present invention is as follows. With the door 2 in its closed position, the shoulder belt guide ring 9 is located at the rearward end of the guide rail 8, as indicated by the solid lines in FIG. 2, while the lap belt guide ring 14 is at its lower and rearward position in the guide rail 13, also as shown in solid lines in FIG. 2. That is the passenger-restraining position of the system; the shoulder belt 3a is wound in the retractor 5, the lap belt 3b is wound in the retractor 15 and the belt portions lead across the passenger in positions which will restrain him in an emergency situation. When the door 2 is opened, the linkage remains folded and the rack gear 24 rotates the input pinion 25. As the pinion 25 rotates, the output gears 30 drive the shoulder and lap transfer mechanisms simultaneously. The racked wire 19, which engages the large driving gear 30a of the output mechanism 30, and, simultaneously, the racked wire 20, which engages the small driving gear 30b, are pulled by the motion amplifier 18 so that the guide rings 9 and 14 are moved from their passenger-restraining positions forward to their passenger-releasing positions along the guide rails 8 and 13, respectively. The movement of the guide ring 9 pulls the shoulder belt 3a from the retractor 5 so that it extends across the seat from a position close to the front pillar 7. At the same time, the lap belt 3b is pulled from the retractor 15 and lifted up and away from the seat along the guide rail 13 toward the front of the door 2. The position of the belts in the passenger-releasing position is shown in FIG. 1 and in phantom lines in FIG. 2. As a result, the occupant can get into and out of the car without any difficulty.

The motion amplifier and transfer mechanisms move the transfer guides fully to the passenger-releasing positions upon only partial opening of the door, say about half-way open. When the door is part-way open, the control guide for the linkage causes the linkage to unfold by activation of the links in a manner which keeps the link 23 and rack gear 24 stationary relative to the door and the motion amplifier. Movements of the door between partly and fully opened positions does not, therefore, produce any movement of the guide rings 9 and 14.

Conversely, when a passenger gets into the vehicle and closes the door, the first link 21 of the folding linkage is pushed back into the door, and the door motion between partly and fully closed is transmitted to the amplifier mechanism 18, which rotates the driving gears 30 and in the opposite direction from that involved in opening the door. Consequently, the racked wires 19 and 20 are pushed forwardly from the motion amplifier 18 and will slide inside their respective guide rails 8 and 13 to move the guide rings 9 and 14 to the occupant-restraining positions.

As discussed above, the passive vehicle occupant restraint belt system according to the present invention uses only one motion amplifier mechanism, a single output shaft and at least two output driving gears on the output shaft. The output driving gears move the respective guide rings back and forth through different distances, but simultaneously with the opening and closing of the door. Consequently, when the door is opened, the movement of the shoulder and lap belts to their respective passenger-releasing positions is accomplished simultaneously and rapidly, without binding, slippage, or jerking of the belt transfer mechanism, thereby assuring smooth operation of the device.

In cases where the distance of movement between the shoulder belt and lap belt is different, conventional devices possess the problem that the load is relatively small for the movement portion where only the shoulder belt is moved and becomes greater along the portion where both of the belts are moved together. The device according to the present invention eliminates the problem of non-uniform load over the entire distance of movement of the belts, and reduces, on an average, the force required to open the door. Moreover, since the guide ring motion amplifier mechanism operates with a single mechanism, in accordance with the present invention, the device is simpler in construction and is less likely to fail. The device is also versatile inasmuch as the desired distance of movement of the transfer guides can be changed simply by changing the diameter of the output driving gears. Accordingly, the same basic device modified in only minor respects can be used in various vehicles.

Although the invention has been shown and described with reference to a particular embodiment thereof, it will be understood that various modifications and changes will be apparent to those skilled in the art, while employing the inventive concept disclosed herein. For example, the dirving mechanism for the motion amplifier has been shown as a folding linkage. In place of this manual linkage, a motorized or pneumatic driving mechanism would, of course, function as effectively in carrying out the objects of the invention. All such variations and modifications are intended to be within the scope of the present invention, as defined in the following claims.

I claim:

1. In a passive occupant restraint belt system for vehicles which includes a lap belt and shoulder belt, apparatus for moving the lap belt and shoulder belt between occupant-restraining and occupant-releasing positions in response to opening of a door of the vehicle comprising lap belt transfer means engaging the lap belt for moving it from the restraining to the releasing position and including a first racked wire, shoulder belt transfer means engaging said shoulder belt for moving it from the restraining to the releasing position and including a second racked wire, rotary drive means having a single output shaft, a first output drive gear element on the output shaft coupled to the first racked wire of said lap belt transfer means and a second output drive gear element on the output shaft coupled to the second racked wire of said shoulder belt transfer means for actuating said first and said second shoulder belt transfer means simultaneously, the first and second output drive gear elements being of different diameters to accommodate different lengths of movement of the respective belt transfer means, and means for operating the rotary drive means responsive to opening of the vehicle door for moving said first and said second belt transfer means from the occupant-restraining to the occupant-releasing position.

2. Apparatus according to claim 1 wherein the lap belt transfer means includes a guide ring engaging the lap belt, a guide rail for receiving and guiding the lap belt guide ring along a path in the interior of said vehicle diagonally upwardly and forwardly from the lower outer end of the inside of the vehicle door, said guide ring adapted to move in said guide rail, and wherein said shoulder belt transfer means comprises a second guide ring engaging said shoulder belt, and a second guide rail extending along a path in the interior of said vehicle in the roof just above the door, said second guide ring adapted to move in said second guide rail.

3. Apparatus according to claim 1, wherein said means for operating the rotary drive means comprises a folding linkage arranged between said vehicle body and door.

4. Apparatus according to claim 3 wherein the rotary drive means is a mechanical motion amplifier which is coupled to the folding linkage.

* * * * *